METHOD OF MANUFACTURING SEMI-CONDUCTOR DEVICES

Filed Jan. 15, 1963 2 Sheets-Sheet 1

INVENTOR.
J. R. A. BEALE
A. F. BEER
BY
Frank R. Trifari
AGENT

INVENTOR.
J. R. A. BEALE
A. F. BEER
BY
Frank R. Jarifani
AGENT

United States Patent Office 3,235,419

Patented Feb. 15, 1966

3,235,419
METHOD OF MANUFACTURING SEMI-CONDUCTOR DEVICES

Julian Robert Anthony Beale, Reigate, and Andrew Francis Beer, Pound Hill, Crawley, England, assignors to North American Philips Company, Inc., New York, N.Y., a corporation of Delaware Filed Jan. 15, 1963, Ser. No. 251,653
9 Claims. (Cl. 148—178)

Figure 1:
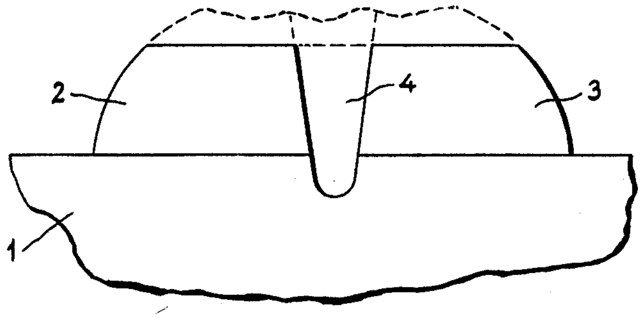

The invention relates to methods of manufacturing semi-conductor devices.

According to the invention, in a method of manufacturing a semi-conductor device, during an alloying process to provide a recrystallized alloy zone of one type conductivity in a semi-conductive body, diffusion takes place simultaneously to provide a diffused zone of the other type conductivity, after heat treatment at a lower temperature to produce a homogeneous molten zone, heating is effected at a higher temperature so that the liquid-solid interface travels into the body faster than, and as herein defined catches up to, the adjacent diffusion front whereupon the temperature is reduced until diffusion ceases whereby the thickness of the diffused zone adjacent to the position of deepest penetration of the liquid-solid interface is determined by the cooling when the temperature is reduced.

Where an alloy liquid-solid interface exists in a body and the temperature is raised, more of the body is dissolved and the alloy front penetrates deeper into the body. The rate of increasing penetration of the liquid-solid interface depends on the temperature rise. With a diffusion front present in the body initially with a deeper penetration than the liquid-solid interface, the heating at a higher temperature is such that the liquid-solid interface travels faster than the diffusion front. In practice, however fast the liquid-solid interface may travel in excess of the normal rate of travel of the diffusion front, there will be a very thin diffused zone preceding it. It is when the condition is reached with the diffusion front travelling faster than the rate determined solely by the diffusion coefficient concerned and with the speed of the liquid-solid interface, that the liquid-solid interface is defined as having caught up to the adjacent diffusion front.

The treatment at a lower temperature may be effected in part at a substantially constant temperature. As an alternative, the treatment at a lower temperature and the treatment at a higher temperature may be effected at a temperature which increases with time.

After reaching the temperature at which diffusion substantially ceases by reduction of the temperature from the higher temperature, the rate of cooling may be reduced in order to reduce residual stress in, and in the neighbourhood of, the recrystallized alloy zone.

The material to be diffused may be provided as a prediffused layer in the semi-conductive body before the alloying process.

Part of the material to be alloyed may be initially lightly alloyed to the body and thereafter the heat treatment at a lower temperature carried out.

A carrier material may be alloyed to the body and the significant impurity material provided in a molten zone including the carrier material. A carrier material is a material which has no significant effect on the conductivity of the semi-conductor.

The body may be of p-type germanium or of n-type silicon and the carrier material may be bismuth, lead or tin. In general, tin will not be used with a germanium body since it tends to alloy to too great a depth and bismuth will not be used with a silicon body since it tends not to alloy sufficiently well.

For germanium, the diffusing donor impurity may be antimony and or arsenic and the acceptor material may be aluminum.

For silicon, the diffusing acceptor material may be boron and the donor material may be arsenic.

A second recrystallized zone may be provided which is of the other type conductivity and provides ohmic connection to the diffused zone. Thus, at an intermediate stage of manufacture, a single alloy zone may be provided and divided into two parts, one part for forming the alloy zone of the one type conductivity and the other part for forming the alloy zone of the other type conductivity.

After provision of the recrystallized alloy zone of the one type conductivity and the diffused zone, the extent of the diffused zone laterally of the recrystallized alloy zone of the one type conductivity may be reduced by etching. The etching may also reduce the area of the junction between the recrystallized alloy zone of the one type conductivity and the diffused zone.

The invention also relates to a semi-conductor device, for example, a transistor or a semi-conductor device of n-p-n-p structure which may be used for switching purposes, when made by the method according to the invention.

Figure 2:
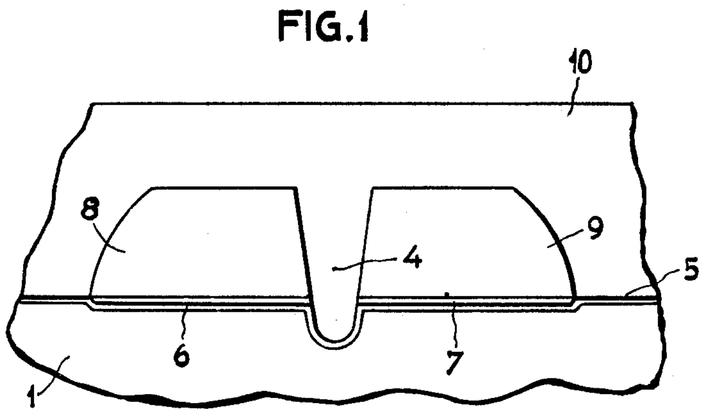
Figure 3:
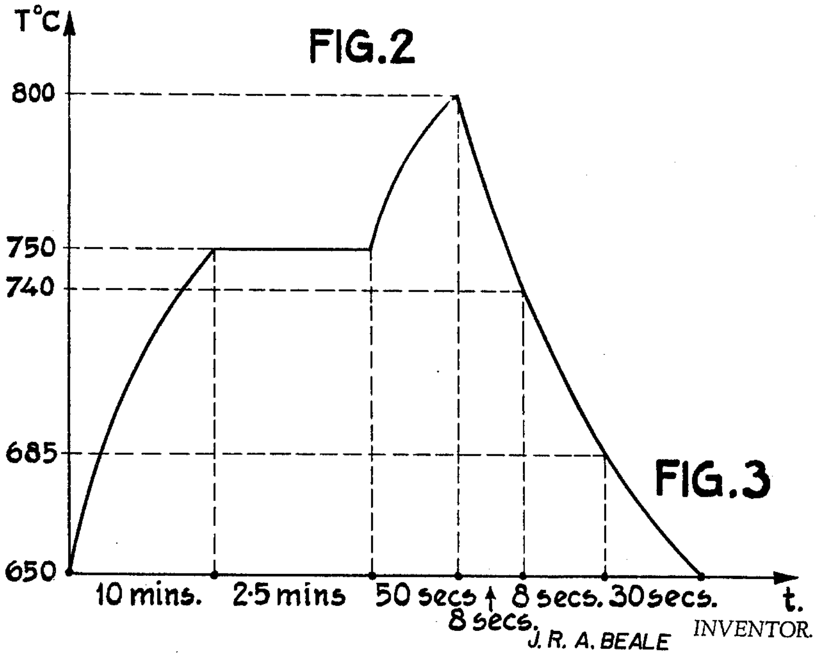
Figure 4:
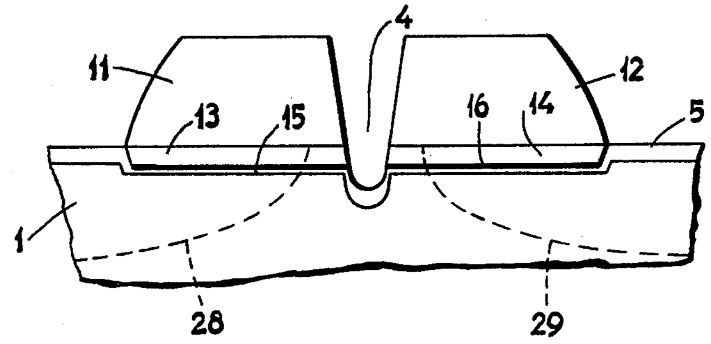
Figure 5:
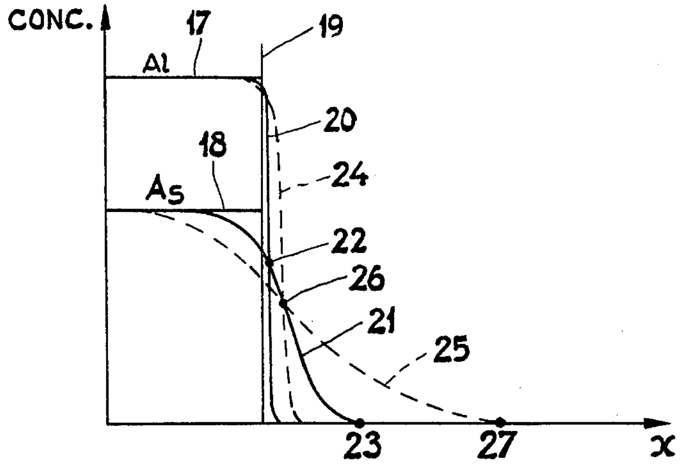

An embodiment of the method according to the invention will now be described, by way of example, with reference to the accompanying diagrammatic drawing, in which:

FIGURES 1, 2 and 4 are cross-sectional views illustrating different stages reached in carrying out the method in the manufacture of a transistor, and FIGURES 3 and 5 are graphs to assist in explaining the method.

Section shading is omitted in FIGURES 1, 2 and 4 since they are easier to read without the shading.

A wafer of single-crystal p-type germanium of resistivity 3 ohm-cm. and having the dimensions 6 thousandths of an inch x 80 thousandths of an inch x 1½ mm., is placed in a carbon alloying jig having apertures for material to be alloyed at 20 positions substantially equally spaced along the length of the wafer.

A spherical pellet of bismuth 7 thousandths of an inch in diameter and containing 0.5% by weight of arsenic is placed in each aperture and the whole is heated in a hydrogen atmosphere at 600° C. for about 3 mins. As a result of the heating, the pellets are lightly alloyed to the wafer to the extent that they are secured in position on the wafer. The arsenic is added to the bismuth to improve the wetting of the surface of the wafer by the material of the pellet. The diameter spreads from 7 thousandths of an inch to about 9.3 thousandths of an inch during the heating.

The top of each projection produced on the wafer by the light alloying is cut off so that the projection extends to about 2½ thousandths of an inch above the surrounding surface of the wafer and each projection is divided diametrically into two parts, for example, with the use of a thin blade, by a thin cut which penetrates substantially to the wafer. Each division is extended into the wafer by sandblasting.

FIGURE 1 shows part of the wafer with one of the projections at this stage.

A wafer 1 has lightly alloyed to it the parts 2 and 3 of the projection which are separated by a division 4 penetrating about 10$\mu$ into the wafer 1. The division 4 is about 12$\mu$ wide at the level of the original surface of the wafer 1. The sandblasting also erodes the projections 2 and 3 to a small extent and the rest of the surface of the wafer 1 to a depth about equal to that of the penetration of the division into the wafer 1. This additional erosion is not of importance and is not shown in the figures. The region of alloying is shallow and the thin recrystallized zone is not shown.

Very fine, very pure alumina polishing powder is preheated in a hydrogen atmosphere for 1 hour at 1,000° C. and made into a cement which is capable of being poured, by mixing with a liquid consisting of 9 volumes of acetone and 1 volume of silicone oil and the cement is poured over the wafer 1 to fill the divisions 4.

The wafer 1 is then placed in a silica boat together with a smaller silica boat 1 cm. in diameter and 5 mm. high filled with a powdered material consisting of tin containing 15% of arsenic by weight and 15% of antimony by weight.

The whole is heated to 660° C. for 10 minutes in an atmosphere of hydrogen and then cooled.

Initially, the cement hardens to form a mould for limiting further spread of the areas of alloying and for keeping the parts of the divided projections separate. During the heating a further penetration of the solid-liquid interface occurs to a depth of about 2$\mu$ and a diffused layer also about 2$\mu$ thick is formed beneath the position of deepest penetration of the solid-liquid interface. The cement while acting as a mould is sufficiently porous to allow pasage of arsenic and antimony to the molten zones formed during heating so that n-type recrystallized zones are formed on coling and additionally diffusion of the donors arsenic and antimony from the molten zones takes place.

FIGURE 2 shows the part of the wafer corresponding to that shown in FIGURE 1 at this stage.

The wafer 1 now has an n-type diffused zone 5 containing antimony and arsenic and recrystallized n-type zones 6 and 7 also containing antimony and arsenic with associated resolidified zones 8 and 9 consisting mainly of bismuth and containing small quantities of antimony, arsenic and germanium. The cement mould 10 is also shown. It will be noted that diffusion has also occured from the surface of the wafer 1 so that the diffused zone 5 is continuous along the surface of the wafer 1, beneath the recrystallized zones 6 and 7 and along the surface of the division 4.

The cement mould 10 is removed. This may readily be effected manually, the cement being brittle after baking.

Aluminum paint consisting of aluminum in a readily volatisable varnish is applied to one of the divided parts of each original projection and a cement mould is again applied as described above.

The whole is heated slowly so that the temperature is raised by about 10° C./min. until a temperature of about 750° C. is reached. This temperature is maintained for about 2½ minutes. Thereafter, the temperature is raised rapidly at about 60° C./min. until a temperature of 800° C. is reached. The whole is then immediately displaced to a cool region of the heating furnance in which the temperature is about 200° C. and simultaneously the furnace heat is turned off. After 2½ seconds the whole is again displaced to a region of the furnace in which the maximum temperature reached is 700° C. The temperatures mentioned above may readily be achieved with a furnace comprising a silica tube on which a winding is provided outside the tube and extending over the regions at which the temperatures of 700° C. and 750° C. are required and a second winding is provided outside the tube and extending over the region at which the temperature of 800° C. is required.

FIGURE 3 shows part of the thermal cycle to which the whole is subjected. It will be noted that the time scale is not linear. Below 650° C. the cooling becomes progressively slower and below 600° C. it is 5° C. to 10° C. per minute.

The period of slow heating up to 750° C. and the period during which the temperature is maintained at 750° C. is necesary for the aluminum to become thoroughly mixed in the liquid form with the liquid bismuth, arsenic, antimony and germanium in the parts to which the aluminum is applied. During these periods, which may be considered together to be a period of heat treatment at a lower temperature, the separation between the liquid-solid interface and the adjacent diffusion front increases. Since this separation determines the base width of the transistor, the base width would have a minimum width determined by the time necessary to produce the homogeneous melts if no other steps were taken.

The period of heat treatment at a lower temperature is followed by the period of rapid increase in temperture (750° C. to 800° C.) during which the liquid-solid interface travels into the body faster than the adjacent diffusion front and catches up to the diffusion front. As explained above, the two fronts do not coincide but the separation becomes very small. The temperature is thereupon reduced until diffusion ceases. For practical purposes this is at about 700° C. for arsenic, the diffusion coefficient for arsenic in germanium being $4\times10^{-11}$ cms.$^2$/sec. at 800° C., $1.2+10^{-11}$ cms.$^2$/sec. at 750° C. and $2.0\times10^{-12}$ cms.$^2$/sec, at 690° C. The separation, and hence the base width, is determined by the cooling from 800° C. to 700° C. and the more rapidly this can be achieved, the less will be the base width. If a base width is to be provided which is greater than the minimum obtainable and by using slower cooling, this cooling can be controlled so that the degree of reproducibility of base width from one device to another is high.

It will be appreciated that the wafer and the oven in which it is heated have a thermal inertia and changes to temperature cannot be abrupt. The part of the thermal cycle shown in FIGURE 3 is therefore idealized to some extent in order better to illustrate the principles involved.

The final cooling is effected substantially slowly since if the rate of cooling is maintained high, physical cracking may occur.

The cement mould is then removed.

FIGURE 4 shows the part of the wafer corresponding to that shown in FIGURES 1 and 2 at this stage. The aluminum part is applied to the left-hand part of the pair of divided parts. The resolidified zone 11 is mainly of bismuth and contains arsenic, antimony, aluminum and germanium and the resolidified zone 12 is mainly of bismuth and contains arsenic, antimony and germanium. The associated recrystallized zones 13 and 14 penetrate more deeply into the wafer 1 than the corresponding zones 6 and 7 of FIGURE 1 and consist mainly of germanium. The zone 13 contains in addition to germanium, aluminum, arsenic, antimony and bismuth and the zone 14, in addition to germanium contains arsenic, antimony and bismuth. As is usual in this art, the quantities of the significant impurities aluminum, arsenic and antimony available in the melts are very large compared with the amounts which can be present in the recrystallized zones so that the conductivity types of the zones are determined by the segregation coefficients of the significant impurities. The zone 13 is p-type due to the predominant effect of the acceptor aluminum and the zone 14 is n-type. It is mentioned that some aluminum does diffuse into the right-hand molten zone but this amount is small and its effect is further reduced by reaction with the arsenic contained therein so that it may be neglected.

The diffused layer 5 is increased in thickness at the surface of the wafer 1 but adjacent the recrystallized zones 13 and 14 the parts 15 and 16 are very thin, in this case about ⅝$\mu$ thick. The diffusion from the left-hand liquid-solid interface is of aluminum, arsenic and antimony and from the right-hand liquid-solid interface of arsenic and antimony. The diffusion coefficient of aluminum is comparatively small so that the entire layer 5, including the parts 15 and 16, is of n-type conductivity. Diffusion again also occurs from the surface of the wafer 1 and at the division 4.

FIGURE 5, again having arbitrary scales, illustrates the manner of diffusion of the significant impurities from a liquid-solid interface into the adjacent solid germanium. As a simplification, only aluminum and arsenic are considered. In FIGURE 5 concentration (conc.) is plotted against distance ($x$) measured into the wafer 1. The horizontal lines 17 and 18 indicate the concentrations of aluminum and arsenic, respectively, in the recrystallizing zone 13, and the vertical line 19 indicates the deepest penetration of the liquid-solid interface. In this figure the effect of any significant impurity initially present in the wafer is also neglected.

The small amount of diffusion which has occurred at the time when cooling starts is neglected. The redistribution of aluminum content due to diffusion during the cooling is indicated by the curve 20 and that of the arsenic by the curve 21. It will be seen that the aluminum is predominant until a depth corresponding to the point 22 is reached. The detectable diffusion of arsenic extends to a depth corresponding to the point 23 so that the base width is given by the horizontal distance between the points 22 and 23. With slower cooling, more diffusion occurs, as is indicated by the broken lines 24 and 25 and the base width is greater, being given by the horizontal distance between the points 26 and 27.

The diffused layer 5 contains the donors antimony and arsenic. However, there will be less arsenic in the part 15 of the layer 5 since a degree of reaction occurs between the arsenic and the aluminum in the left-hand melt.

Bismuth is present both in the recrystallized zones 13 and 14 and in the diffused layer 5. The amounts of bismuth present in the zones 13 and 14 and the layer 5 are small, since bismuth is not highly soluble in germanium. The bismuth is used, as is generally known, in its role as a carrier material, bismuth not being a significant impurity, that is having no effect on the conductivity type of germanium.

The wafer is separated into 20 pieces by dividing between each of the adjacent pairs of contacts (11 and 12), for example, by sawing or by scoring the surface of the wafer and breaking manually.

A collector contact and connection are provided to each piece by lightly alloying a spherical pellet of indium 40 thousandths of an inch in diameter on the wafer 1 opposite to the position of the zone 13 by heating at about 500° C. in an atmosphere of hydrogen and after cooling the indium is secured to a nickel strip by placing the surface of the indium contact on the nickel strip which is supported on a hot-plate having a temperature of about 180° C.

Nickel wire connections are provided to the resolidified zones 11 and 12 by soldering using a hot-air jet and lead-tin eutectic solder, to provide an emitter connection and a base connection, respectively.

The pieces so connected are then etched electrolytically in a sodium hydroxide or potassium hydroxide bath by passing a high current of some milliamps through the emitter lead. The bottom of the division 4 is protected during etching by a resist lacquer provided in the division 4 and which is dissolved away when the etching is completed. The etching is continued until a great part of the material beneath the resolidified zones 11 and 12 is removed as is indicated by the broken lines 28 and 29 in FIGURE 4 so that the area of the emitter-base junction is limited and hence the emitter-base internal capacity is reduced.

The etched pieces are then washed and dried and encapsulated separately in any known manner.

A transistor manufactured by the method described above may have a base resistance as low as about 20 ohms and operate at a frequency greater than 1,000 mc./sec.

It is not necessary that a period of stability of temperature, such as that shown in FIGURE 2 at 750° C., is provided as long as sufficient time is given for a homogeneous melt to be formed in which aluminum and germanium are in equilibrium during the first part of the heating, that is, at the lower temperature, and the raising of the temperature thereafter is rapid enough for the liquid-solid interface to catch up to the adjacent diffusion front. Thus, the heating from 680° C. to 800° C. may be effected at a substantially steady rate of about 50° C./min.

The penetration of the division 4 into the wafer 1 must be sufficient that the two molten zones remain separate. Thus the higher the maximum temperature of heating to be used the deeper must the division 4 be made.

It is not necessary to start by alloying and dividing single pellets. Pellets may alternatively be alloyed in pairs separated by a short distance and in this case the use of a cement mould is not, in general, necessary. If the wafer is of silicon, pairs of pellets will usually be used.

For a germanium device it is advisable to start with a wafer of p-type germanium and for a silicon device with a wafer of n-type silicon since known donors diffuse faster than known acceptors in germanium and known acceptors diffuse faster than known donors in silicon.

A method similar to that described above may be used in the manufacture of a silicon transistor, the temperatures being chosen higher to suit the diffusion into and alloying to silicon. Two pellets of tin being used as the carrier material and the diffusing material being boron and/or phosphorus which may be provided as a prediffused layer. Aluminum is painted onto one projection consisting mainly of tin and containing also silicon and boron and/or phosphorus and the whole heated in an atmosphere containing arsenic. The arsenic does not affect the molten zone containing aluminum and the recrystallized zone remains n-type whereas the other molten zone absorbs arsenic and becomes p-type. The absorption of arsenic to provide a homogeneous molten zone containing sufficient arsenic takes a little time, although not so long as does the production of the homogeneous zone containing aluminum in the example described above in which a germanium body is used, and the final heating step is again carried out at a higher temperature so that the liquid-solid interface catches up to the adjacent diffusion front.

It is not necessary to provide two recrystallized zones, one n-type and one p-type, in the manner described above by using two initial pellets or one initial pellet which is later separated, since connection to the diffused zone may alternatively be made in other known ways. In general, however, the connection to the diffused zone is preferably made close to the emitter zone in order that the resistance between the connection to the diffused zone and the diffused zone-emitter p-n junction may be low.

What is claimed is:

1. A method of manufacturing a semiconductor device, comprising fusing a mass of an alloying material at a surface of a semiconductive body in the presence of a first segregating impurity of one-determining type of conductivity and a second diffusing impurity of the opposite-determining type of conductivity at a first lower temperature until a homogeneous molten zone is produced and a liquid-solid interface at a certain depth within the body, said diffusing impurity diffusing into the underlying body portions to establish in advance of the liquid-solid interface a diffusion front advancing into the body at a rate dependent upon the prevailing temperature, thereafter heating to a second substantially higher temperature at a sufficiently rapid heating rate at which the liquid-solid interface advances into the body at a rate faster than that at which the diffusion front advances into the body at said second temperature and until said liquid-solid interface catches up to the said diffusion front, and thereafter cooling by reducing the temperature to a lower third value until further diffusion effectively ceases and the melt solidifies forming a recrystallized zone dominated by said one-determining impurity and of said one conductivity type adjacent to a thin diffused region dominated by said opposite-determining impurity and of said opposite conductivity type and whose thickness adjacent to the deepest penetration of the liquid-solid interface is primarily determined by the duration of the cooling step.

2. A method as set forth in claim 1 wherein the semiconductor is of germanium, the diffusing impurity is selected from the group consisting of antimony and arsenic, and the segregating impurity is of aluminum.

3. A method as set forth in claim 1 wherein the semiconductor is of silicon, the diffusing impurity is of boron, and the segregating impurity is of arsenic.

4. A method as set forth in claim 1 wherein the alloying mass includes a carrier selected from the group consisting of bismuth, lead, and tin, and the impurities are added to the mass.

5. A method as set forth in claim 1 wherein the diffusing impurity is provided as a prediffused coating on the body prior to fusion of the alloying mass.

6. A method of manufacturing a semiconductor device, comprising fusing at a surface of a semiconductive body a mass of an alloying material containing a first segregating impurity of one-determining type of conductivity and a second diffusing impurity of the opposite-determining type of conductivity at a first lower temperature until a homogeneous molten zone is produced and a liquid-solid interface at a certain depth within the body, said diffusing impurity diffusing into the underlying body portions to establish in advance of the liquid-solid interface a diffusion front advancing into the body at a rate dependent upon the prevailing temperature, thereafter heating to a second substantially higher temperature at a sufficiently rapid heating rate at which the liquid-solid interface advances into the body at a rate faster than that at which the diffusion front advances into the body at said second temperature and until said liquid-solid interface catches up to the said diffusion front, and thereafter cooling by reducing the temperature to a lower third value until further diffusion effectively ceases and the melt solidifies forming a recrystallized zone dominated by said one-determining impurity and of said one conductivity type adjacent to a thin diffused region dominated by said opposite-determining impurity and of said opposite conductivity type and whose thickness adjacent to the deepest penetration of the liquid-solid interface is primarily determined by the duration of the cooling step.

7. A method as set forth in claim 6 wherein said fusing step at said first temperature is effected at least in part at a substantially constant temperature.

8. A method as set forth in claim 6 wherein the heat treatments at the first and second temperature are carried out at temperatures that increase with time.

9. A method as set forth in claim 6 wherein during the cooling step, after the temperature is reached at which substantially no more diffusion occurs, the cooling rate is reduced.

References Cited by the Examiner

UNITED STATES PATENTS

| | | | |
|---|---|---|---|
| 2,836,520 | 5/1958 | Longini | 148—181 |
| 2,836,521 | 5/1958 | Longini | 148—185 |
| 2,840,497 | 6/1958 | Longini | 148—185 |
| 2,894,862 | 7/1959 | Mueller | 148—177 |
| 3,054,701 | 9/1962 | John | 148—181 |
| 3,074,826 | 1/1963 | Tummers | 148—185 |

DAVID L. RECK, *Primary Examiner.*